United States Patent [19]

Glass, Jr.

[11] Patent Number: 4,486,340
[45] Date of Patent: Dec. 4, 1984

[54] TREATMENT OF WATER THICKENED SYSTEMS

[75] Inventor: Joseph E. Glass, Jr., Charleston, W. Va.

[73] Assignee: Union Carbide Corporation, Danbury, Conn.

[21] Appl. No.: 391,953

[22] Filed: Jun. 24, 1982

Related U.S. Application Data

[63] Continuation of Ser. No. 176,359, Aug. 8, 1980, abandoned, which is a continuation-in-part of Ser. No. 27,058, Apr. 4, 1979, abandoned, which is a continuation of Ser. No. 806,719, Jun. 15, 1977, abandoned.

[51] Int. Cl.³ .............................................. E21B 43/22
[52] U.S. Cl. .............................. 252/8.55 D; 166/275; 252/8.5 C
[58] Field of Search .................. 252/8.55 D; 166/274, 166/305 R, 275

[56] References Cited

U.S. PATENT DOCUMENTS

| | | | |
|---|---|---|---|
| 3,119,447 | 1/1964 | Raifsnider et al. | 252/8.55 X |
| 3,305,016 | 2/1967 | Lindblom et al. | 252/8.55 X |
| 3,313,736 | 4/1967 | Dickson et al. | 252/8.55 X |
| 3,343,601 | 9/1967 | Pye | 166/275 X |
| 3,511,313 | 5/1970 | Eilers et al. | 252/8.55 X |
| 3,752,233 | 8/1973 | Svaldi et al. | 166/305 X |
| 3,822,749 | 7/1974 | Thigpen | 166/305 X |

*Primary Examiner*—Herbert B. Guynn
*Attorney, Agent, or Firm*—Henry H. Gibson; Donald M. Papuga

[57] ABSTRACT

This invention is concerned with the treatment of water systems to which are provided water-soluble polymeric materials having the capability of increasing the viscosity of water in which they are provided. In particular, the invention is concerned with providing an alkylene polyamine or an alkanolamine in an aqueous system to which has been provided a water-soluble, polymeric material which increases the viscosity of the aqueous medium.

17 Claims, 19 Drawing Figures

| $Fe^{+2}$ | $S_2O_4$ | CaO | TEPA |
|---|---|---|---|
| — | 5.0 | 250 | — |
| 5.0 | 5.0 | 250 | — |
| 5.0 | 5.0 | 125 | 125 |
| 5.0 | 5.0 | — | 250 |

TREATMENT OF WATER THICKENED SYSTEMS

This application is a continuation of application Ser. No. 176,359, filed Aug. 8, 1980, now abandoned, which is a continuation-in-part of application Ser. No. 027,058, filed Apr. 4, 1979 now abandoned, which is a continuation of application Ser. No. 806,719, filed June 15, 1977, now abandoned.

This invention is concerned with water systems which are employed in subterranean processes such as the drilling of oil wells, or in the enhanced recovery of oil. More generally, this invention is concerned with the treatment of water systems to which are provided water-soluble polymeric materials having the capability of enhancing or increasing the viscosity of water in which they are provided. In particular, the invention is concerned with providing a polyalkylene polyamine, an alicyclic amine and/or a alkanolamine in an aqueous system to which has been provided a water-soluble, polymeric material which increases the viscosity of the aqueous medium.

It is well recognized that one of the serious problems in the drilling of oil wells or in the enhanced recovery of oil, such as occurs in secondary and tertiary recovery of oil using water as the pushing medium, is the attack of metal materials utilized in those processes by dissolved oxygen in the water. The oxygen causes corrosion of the metal thereby depositing salts of the metal or hydroxides of the metal into the aqueous media where the same can be eventually oxidized and caused to precipitate as solids to adversely affect the ability to drill the deposit or to utilize the aqueous medium for enhanced oil recovery. With respect to enhanced recovery of oil, such as secondary and tertiary recovery, water is employed as a driving medium for displacement of additional oil from the oil reservoir. This displacing medium is injected in the reservoir by means of one or more of the original wells or by means of entirely new wells and the oil in the reservoir is displaced toward and withdrawn from one or more of the other remaining wells. Because water is generally readily available in many regions, it has been extensively employed as a driving or pushing medium in secondary and tertiary oil recovery programs. In a typical case, water under pressure is injected at various points into a partially depleted oil-bearing reservoir rock formation to displace portions of the residual oil therein and the displaced oil is driven towards a producing well from which it is recovered by pumping. It is then separated from the water which has been pumped from the producing well and this water is conveyed to a storage reservoir from which it can again be pumped into the injection well or wells. Supplementary water from other sources may be used in conjunction with the produced water. When the storage reservoir is opened to the atmosphere and the water is subjected to aeration, this type of water-flooding system is referred to as an open water-flooding system as contrasted from a closed water flooding system in which the water is recirculated in a closed system without substantial aeration. The last mentioned system thus generally operates under anaerobic conditions.

Two general types of water are employed for secondary or tertiary oil recovery. Probably the most widely used type is fresh ground water obtained from rivers, lakes, wells, etc. In some places, however, brine waters from producing oil wells are used because of the limited supply of fresh ground water, as well as due to the large requirements of water in repressurizing operations. In some areas, it has been found convenient to use a mixture of brine waters and fresh ground waters.

It is well recognized that there is a corrosion problem caused by the presence of dissolved oxygen in the water. The presence of even very small amounts of dissolved oxygen in the waters used in the waterflooding or water containing medium serving to drive the oil will cause corrosion of metal pipes used in the operation and this corrosion is particularly exemplified by pitting of the metal parts. This pitting occurs in closed waterflooding systems, i.e., those which operate under anaerobic conditions, because even under such operating conditions the flooding waters have small concentrations of oxygen dissolved therein, these concentrations being nevertheless sufficient to cause the above pitting type of pipe surface corrosion. Even with only trace concentrations of oxygen, e.g., 0.1 part per million (ppm) or even lesser amounts of oxygen, which may be present in the driving medium used in secondary or tertiary oil recovery under anaerobic conditions the large volumes of such water moving through the pipes makes significant amounts of oxygen available to large cathodic areas surrounding very small anodic spots thus causing considerable pitting corrosion.

The flooding or driving medium which usually comprises water or oil field brine have added to them various conditioning materials, for example, surface active agents or detergents which promote the desorption of the residual oil from the formation, sequestering agents which prevent the deposition of calcium and/or magnesium compounds in the interstices of the formation, bactericides which prevent the formation from becoming plugged by bacterial or algae growth, corrosion inhibitors which prevent corrosion of the metallic well equipment and the consequent deposition of corrosion products in the formation, and like.

Conventional waterflooding of a subterranean oil reservoir to obtain additional oil has a number of shortcomings which detract seriously from its value. Foremost among the shortcomings is a tendency of flood water to "finger" through a reservoir and to by-pass substantial portions of the reservoir. Moreover, a water drive has a less than perfect "sweep efficiency" in that it does not contact all portions of the reservoir and therefor channels through resevor formation. Furthermore, it does not normally displace as much oil in the portions of the reservoir which it contacts as it theoretically is capable of doing.

The channelling tendency of a waterflood is usually explained by the fact that oil reservoirs possess regions and strata that have different permeabilities and this has become very well recognized in the application of enhanced oil recovery technology. The water flows more rapidly through those regions in strata having a greater relative permeability to water than in other portions of the reservoir. As a result, the water achieves an inefficient displacement of the oil.

It should be recognized that crude oils vary greatly in viscosity, from being as low as one or two centipoises (cps) and some ranging up to 1,000 cps and even more. It has been established that simple water flooding performs less satisfactorily with viscous crude oils than with relatively non-viscous oils. In other words, the fingering and by-passing tendencies of the water drive are more or less directly related to the ratio of the viscosity of the reservoir oil to the viscosity of the aqueous driving medium. The following equation constitutes a mathematical relationship which can be employed to explain the behavior of fluids flowing through porous media such as oil reservoirs:

$$(M_o/M_e) = (m_{er}/m_o) \times (K_o/K_e)$$

wherein $M_o$ is the mobility of the oil to the reservoir in question;

$M_e$ is the mobility of the flooding medium to the reservoir in question;

$m_o$ is the viscosity of the driven oil;

$m_e$ is the viscosity of the flooding medium;

$K_e$ is the relative permeability of the reservoir toward the flooding medium in the presence of residual oil; and $K_o$ is the relative permeability of the reservoir toward the oil in the presence of driving water.

The equation is perhaps best explained by stating that when the mobility ratio of oil to the driving fluid within the reservoir is equal to one, the oil and driving fluid move through the reservoir with equal ease. Substantially equilibrium proportions of driving fluid and oil remain within the reservoir as soon as the driving fluid has passed therethrough. Expressed otherwise, the mobility ratio term affords a measure of the volume of driving fluid and the amount of time that is required to reduce the oil content of the reservoir to an ultimate equilibrium value. For example, a given volume of driving fluid operated at a mobility ratio of one or greater will displace a markedly greater volume of oil from a reservoir than will an equal volume of driving fluid operating at a mobility ratio of less than one.

A procedure which has been employed to reduce the degree of fingering and by-passing has been to increase the viscosity of the water drive medium relative to the oil by incorporating into the water, of a water soluble polymeric mobility control agent, that is, a material which can increase the viscosity of the water sufficient to provide an effective viscosity (or reciprocal of the mobility within the reservoir) which is at least substantially equal to and preferably greater than that of the reservoir oil and/or any oil displacing liquid (such as an aqueous or oil external surfactant system) that is injected ahead of the viscosity enhanced solution. This mobility ratio, the measure of the volume of displacing fluid which will be required to reduce the oil content of a reservoir to an ultimate equilibrium value, has also been defined by another equation, that is:

$$MR = V_o K_w / V_w V_o$$

wherein K designates the reservoir permeability, V represents the viscosity and the subscripts w and o denote water and oil respectively. According to this equation, a mobility ratio of unity indicates that the water and the oil will move through the reservoir in the presence of one another with equal ease and a given volume of water at a mobility ratio of less than one will displace a markedly greater volume of oil from a reservoir than will the same amount of water at a mobility ratio greater than one.

A variety of water soluble polymeric materials can be used as mobility control-agents in water for the purpose of enhancing oil recovery such as is the case in secondary and tertiary oil recovery systems. Suitable for these purposes are the hydroxyethycelluloses illustrated by Cellosize ® brand hydroxyethylcellulose such as numbers QP3, 300, 4400, 15,000, 30,000, 52,000, and 100M, manufactured and sold by Union Carbide Corporation, the partially hydrolyzed polyacryamides such as those described in U.S. Pat. No. 3,039,529, patented June 19, 1962, and illustrated by a polyacrylamide which has been hydrolyzed to provide from about 10 to about 40 weight percent of the amide group having been hydrolyzed to sodium carboxylate groups (see U.S. Pat. No. 3,343,603, patented Sept. 26, 1967).

Another class of water-soluble polymeric mobility control agents are the polyacrylamide copolymers of acrylamide with acrylic acid, methacrylic acid and alkali metal salts of the acids. Other polymeric mobility control agents are the water-soluble alkylene oxide polymers, polymeric sulfonates, polyvinyl alcohols, and esters and amides of styrene-maleic anhydride copolymers. In this respect references made to U.S. Pat. Nos. 2,731,414; 2,827,964; 2,842,492; 3,018,816; 3,079,337; and 3,085,063. U.S. Pat. No. 3,079,336, patented Feb. 26, 1963, describes a number of useful polymers such as a styrene maleic anhydride copolymer and a half methyl ester derivative of that copolymer which as a salt can be dissolved in reservoir water utilizing an alkali metal hydroxide such as sodium hydroxide. Other useful materials characterized are polyacrylic acid and polyethylene oxide such as the high molecular weight polymers of ethylene oxides characterized as Polyox ® resins, manufactured and sold by Union Carbide Corporation. Other polymers which have been characterized as water soluble, polymeric mobility control agents are the sulfonated polystyrenes and the sulfonated polyvinyl toluenes.

As pointed out in U.S. Pat. No. 3,292,696, hydroxyethylcellulose is an effective mobility control agent. Polysaccharides, as a class, are known to be water-soluble polymeric mobility control agents. For example, dextran and ionic and non-ionic polysaccharides had been recognized for some time as suitable water soluble polymeric mobility control agents (see U.S. Pat. Nos. 3,084,122, patented Apr. 2, 1963 and 3,766,983, patented Oct. 23, 1973). Carboxymethyl cellulose has been described as a water soluble mobility control agent in U.S. Pat. No. 2,731,414, patented Jan. 17, 1956.

Other water-soluble carbohydrates include guar gum and substituted guar gums such as hydroxyethyl, hydroxypropyl, carboxymethyl, hydroxypropyl carboxymethyl, and ether derivatives thereof, guar gums. Other carbohydrates including locust beam gums may be suitably employed.

The disclosures of the foregoing patents relative to the sepcific classes of mobility control agents described in them are incorporated herein by reference. Such mobility control agents may be used in the practice of this invention.

Though some prior art has failed to recognize any problems associated with the use of these water soluble polymeric mobility control agents in enhanced oil recovery, there is a substantial body of literature which points to the fact that these agents tend to degrade when they are so utilized. A number of factors have been cited for the cause of this degradation. For example, some authors have referred to one or more of the following as the basis for causing the degradation of one or more of the various water soluble polymeric mobility control agents described previously: oxidation, heat, bacteria, reactions and metal salts, and coreaction with other additives. In the main, the factors which are considered to be the most significant in causing the degradation of these water soluble polymeric mobility control agents are the combination of heat, oxygen (even in minute quantities) and reaction with or through the agency of metals and metal salts present in the oil reservoir, or dissolved or carried in the water medium. A number of provisions have been taken by the art to eliminate the oxygen problem and these include the addition of a number of sulfites and phosphonates. In particular, sodium sulfite and sodium hydrosulfite (sodium dithionite) have been found to be effective in eliminating oxygen in the water employed in the enhanced oil recovery effort. The materials are regarded to be lower-cost, more-reactive oxygen scavengers, and hence, are regarded to be desirable materials to employ, if possible. However, it has been established by Knight, infra, that the use of sodium hydrosulfite in combination with for example the hydrolyzed polyacrylamide mobility control agent in the presence of oxygen adversely affects the stability of the agent causing it to be rapidly degraded and resulting in a substantial viscosity reduction and loss of the possibility of enhanced oil recovery. However, Knight, infra, clearly indicates that if the water is first treated with the sodium hydrosulfite and the hydrolyzed polyacrylamide is subsequently introduced to the well then the degradation problem is materially reduced so long as oxygen is not re-introduced. In fact, the degradation of the polymer becomes significantly less of a problem than would occur in the absence of any treatment with sodium hydrosulfite. Materials such as thiosulfates, formaldehyde, dialdehyde, and the like, have been disclosed as additives for improving the stability of the partially hydrolyzed acrylamides against thermal and oxidative degradation. Another procedure which is employed to avoid degradation of these polymers is to maintain a proper solution pH in the water drive fluid so as to avoid any potential for acid hydrolysis of the polymer.

There is described herein a procedure by which the problems associated with oxidative degradation of the water soluble polymeric mobility control agents can be materially reduced while at the same time providing better control over solution pH conditions whereby to avoid acid hydrolysis and also minimize the adverse effects which can be derived from the presence of metal salts in the reservoir such as those obtained by the oxidative corrosion of metal parts in the well piping.

This invention relates to additives which can be employed under realistic application conditions to provide viscosity stability for water-soluble polymeric mobility control agents in aqueous solutions with a reasonable degree of reproducability. This invention is also concerned with the viscosity stability of water soluble polymers in aqueous solution which can be used as a drilling fluid (such as described in German patent application, P 25 24 991.6 corresponding to U.S. application Ser. No. 498,358, filed Aug. 19, 1974 in the name of Walter J. Weiss, assigned to Texaco Development Corporation). Moreover, this invention involves additives which deal with the problems of dissolved oxygen and the sequestering of transition metal ions, effects a maximum cost-thickening efficiency of synthetic polyelectrolytes by minimizing the need for ionic scavengers and/or by moderating their activity, and provides solution pH control which inhibits biological degradation under aerobic conditions of non-synthetic water soluble polymers containing multiple acetal linkages.

It has been discovered that alkylene polyamines (and in select cases, alkanolamines) (collectively—"amines") effectively eliminate or minimize viscosity losses of aqueous solutions containing water-soluble polymer mobility control agents which appear to be caused by thermal, oxidative, hydrolytic and biological degradation.

It also has been discovered in accordance with the present invention that such alkylene polyamines (in select cases, alkanolamines) moderate the activity of lower-cost, more-reactive oxygen scavengers so that the latter materials may be used with the mobility control agents even in the presence of trace amounts of residual and re-introduced oxygen without causing the substantial visosity losses which have been known to those skilled in the art of polymer waterflooding. In accordance with this invention, these alkylene polyamines (and in select cases, alkanolamines) can be used with lower-cost, more-reactive oxygen scavengers to effect more economical formulations for eliminating or minimizing viscosity losses of aqueous solutions containing small amounts of water-soluble polymeric mobility control agents. The oxides or hydroxides of non-transition metals, within their solubility limitations, may also be used in aqueous solution compositions for more economical manipulations of the solution's pH.

Heretofore, employment of the lower-cost, more-reactive oxygen scavengers has not proven effective under realistic application conditions for stabilizing the viscosities of aqueous solutions containing small amounts of polymeric mobility control agents which had been employed originally in amounts to increase the viscosity of the water driving medium. These active reducing agents are effective in converting ferric hydroxide into soluble ferrous salts but this reducing component (ferrous ion) is believed to form an activated complex with residual amounts of dissolved oxygen, usually introduced in the polymer post-addition step, which is more reactive towards degradation of the polymeric thickener than oxygen alone. The interaction of the sulfite, dithionite, etc., with oxygen is detrimental to solution viscosity stability, even with less than 0.2 ppm of transition metal ions present. The addition of the amines eliminates or minimizes these causes for viscosity losses. The minimum amount of the amine required is proportional to the amount of reducing agent employed, the quantity of residual oxygen introduced in the various stages of solution preparation and its injection into the oil reservoir, and the amount of transition metal ion contamination expected during preparation and transmission of the thickened fluids through wellbore casing into the reservoir and in recovery. These criteria are best evaluated by injecting the thickened fluid into the subterranean formation for each injection well and then analyzing the fluid recovered by back-flushing from the reservoir after an approximate thirty day interval.

It is observed that these amines do not interfere with the scavenging reaction of dithionite anions at 72° C. or above or of sulfite anions at elevated temperatures. The amines serve to modify the activity of these materials to avoid the rapid degradation of the polymer as compared to when the amine is not employed. The use of non-transition metal oxides and/or mono-amines, to a lesser degree, help to modify the activity of such materials. The addition of polymeric thickeners prior to the oxygen scavenging components represents an unexpected advantage of this invention [e.g., see Knight, J.

of Petroleum Technology, pp 618–626 (May 1973); Note the discussion at p. 621, col. 2]. By incorporating the polymers which possess good dispersing characteristics into neutral pH solutions before such materials are added will facilitate good dissolution of such materials, with less applied shear to solubilize the polymer. This can achieve better dissolution of the water soluble polymers with fewer gel structures in the solution and less strenuous criteria for filtration of the thickened solutions. A significant aspect of this invention is the stability imparted to synthetic polyelectrolytes without compromising their cost-thickening efficiency. Also important is the ability to achieve high alkalinity in the aqueous driving fluid in those instances when polysaccharides are employed as the mobility control-agent. This materially minimizes biological and hydrolytic degradations of such agents.

Examples of alkylene polyamines useful in practicing this invention include the following: ethylenediamine, 1,2-propylene diamine, 1,4-butylene diamine, diethylene triamine, dipropylene triamine, triethylene tetramine, tripropylene tetramine, tetraethylene pentamine, tetrapropylene pentamine, cycloalkyleneamines, such as piperazine and N-substituted piperazines, polyalkyleneimines, i.e., the higher molecular weight amines derived from alkyleneimine such as polyethyleneimines, polypropyleneimines, for example, having 50, 100 or more alkylene amino units, etc. Mixtures of the above polyamines and those polyamines containing both ethylene and propylene groups, for example:

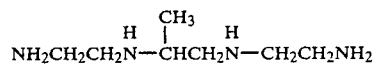

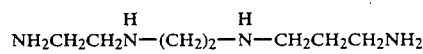

These include the following:

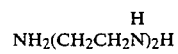

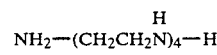

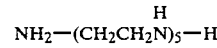

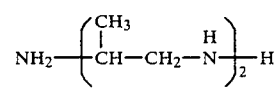

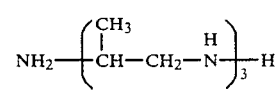

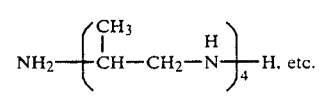

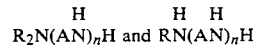

In addition, the starting polyamine may be of a technical grade such as "Amine E-100" from Dow Chemical Company. Amine E-100 is the still bottoms from a polyalkylene polyamine process with the following approximate composition:

|  | Percent |
|---|---|
| Tetraethylene pentamine ($H_2N(CH_2CH_2N)_4H$ with H on middle N) | 10 |
| Pentaethylene hexamine ($H_2N(CH_2CH_2N)_5H$ with H on middle N) | 40 |
| Cyclics (piperazines) | 20 |
| Branched Structure | 20 |
| Polymers (chains with more than five ethylene amine groups) | 10 |

Also included within the term alkylene polyamine as used herein are substituted polyamines such as N-alkyl, N-aryl etc., compositions

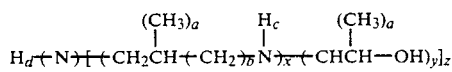

where R is alkyl, alkenyl, n is a positive number and A is alkylene. To insure water solubility of the substituted polyamines at elevated temperatures, i.e., as high as 300° F., the substituted polyamines of the invention are restricted to those wherein the alkyl or alkenyl groups contain no more than three carbon atoms.

Alkanol amines suitable for use in the practice of this invention include those having the following average formula:

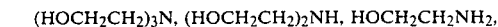

wherein each a is 0 or 1; b is 0 to 1, inclusive; c is 0 to 1 inclusive; d is 3-z; x is 0 to 4 inclusive; y and z are 1 to 3, inclusive, and when c is greater than 0, y is 3-c. Illustrative compounds include the following:

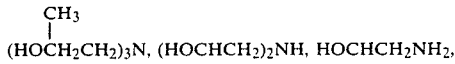

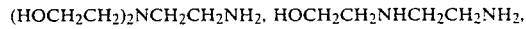

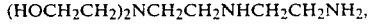

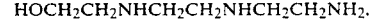

and the like.

The preferred amines are the alkylene polyamines in which the alkylene contains 1 to about 3 carbon atoms, and the most preferred amines are polyalkylene polyamines, that is, amines which contain more than 2 nitrogen atoms.

A standard test for preselecting a suitable alkylene polyamine (including the alkanolamine) additive for use in eliminating or minimizing the viscosity losses of aqueous solutions, containing these water soluble polymeric mobility control agents is the effectiveness of the additive at 300 ppm concentration in a hydroxyethylcellulose (Cellosize ® 100M) solution (having a 90 cps viscosity, see Experimental Procedure, infra), to achieve a solution maintained at 35° C. (95° F.) which retains at least 60% of its measured viscosity after 24 hours and thereafter there is less than 30% additional measured viscosity loss at the end of 10 days. In this test, the oxygen concentration of the solution is reduced to approximately 1 ppm by nitrogen purging prior to polymer addition, and a primary oxygen scavenger, e.g., sodium sulfite or sodium dithionite, at a 25 ppm and 5 ppm concentration, respectively, are post-added in slurry or solution form to the thickened solution at ambient temperatures. The preferred amines of this invention are those which by the same test, but operated at 57.22° C. (135° F.) achieve the same viscosity retention.

A more stringent test is the ability of a preselected amine at a 1000 ppm concentration to inhibit degradation, i.e. approximately 70% viscosity retention after 24 hours with 30% or less viscosity loss over the following 10 days of time, of the same hydroxyethyl cellulose polymer in oxygen saturated (8.5 ppm) solution (same viscosity) at 90.56° C. (195° F.).

A secondary test in preselecting an amine is its ability to scavenge greater than forty percent of the oxygen in an oxygen saturated aqueous solution maintained at 90.56° C. for 10 days. An additional secondary test is the ability of a preselected amine at 250 ppm concentration to sequester the viscosity degrading effects of 10 ppm ferrous ion on the same hydroxyethyl cellulose solutions (same viscosity) in aqueous, oxygen saturated solutions maintained at 57.22° C. These or a similar set of criteria can be used to preselect amine stabilizers, alone or in combination with other more reactive oxygen scavengers and/or in combination with basic oxides or hydroxides of non-transition metals, in eliminating or minimizing (at high temperatures) the viscosity losses of aqueous water-soluble polymer solutions caused by thermal, oxidative, hydrolytic and biological degradation.

It has been found that the amines, as described herein, when employed in aqueous solutions thickened with water-soluble polymeric mobility control agents can simultaneously scavenge dissolved oxygen from aqueous solutions, complex transition metal ions capable of forming insoluble hydroxide compounds, which may plug wellbore configurations, and complex the lower valence states of transition metal ions, which as discussed below can be very detrimental to maintaining polymer solution viscosities. In addition, the amines serve to facilitate alkaline solution conditions, for inhibiting biological degradation of the non-synthetic water-soluble polymers (e.g., the polysaccharides) under aerobic conditions. Some of the amines possess biocidal properties in their own right and this is desirable.

Because of this effectiveness of the amines, one may also employ several low-cost components as supplements in minimizing aqueous water-soluble polymer solution viscosity losses. For example, the amines tend to moderate the reactivity of lower-cost, oxygen scavengers, i.e. sulfite, dithionite anions, etc., in regards to the degradation of the water-soluble polymeric mobility control agents in the presence of low dissolved oxygen concentrations, with or without significant amounts of ferrous ion present. The resulting lower cost formulations may also include components for more economical control of solution pH without detrimentally affecting solution viscosity.

The amount of the water-soluble polymeric mobility control agent to be supplied to an aqueous driving medium is that amount which is typically considered useful by the art. The amount employed will be dependent upon a number of considerations, such as, whether the medium comprises fresh water or brine, the nature of the salts in the medium and/or the reservoirs, the particular mobility control agent chosen, the temperature at the time of addition and in the oil reservoir, the viscosity of the oil to be recovered, the presence of a slug (or if this medium is to be the slug) and its viscosity requirements, the permeability of the reservoir, and the like. As a rule, the amount of the water-soluble polymeric mobility control agent will be such as to cause the water in contact with the oil in the reservoir to have a viscosity, while in the reservoir, which is at least equal to the viscosity of the oil. In the preferred operation, the amount of the water-soluble polymeric mobility control agent provided in the aqueous drive medium should not be so great as to cause the thickened medium to have undesirable reduction in ability to permeate the reservoir.

In the case where the agent is hydroxyethyl cellulose, even slight amounts of it are effective for the purpose since the water viscosity is increased by the presence of the additive, however it is preferred that a sufficient amount be added to attain a water viscosity of at least about 1 centipoise or greater at the reservoir temperature. When possible, it is preferred to add hydroxyethyl cellulose in an amount sufficient to achieve a water viscosity between about 10 and 1000 centipoises. The exact amount necessary to provide these viscosities is dependent on the reservoir temperature, the molecular weight and substitution of the hydroxyethyl cellulose, as well as the nature and amount of impurities and salts in the flood waters. Usually, however, this amount is between about 0.001 and 1.0 weight percent of the solution.

In the case where the agent is a natural polysaccharide, the amount may range between about 0.001 to about 1.0 weight percent of the solution. The polyacrylamides may be used in amounts of between about 0.001 to about 1.0 weight percent of the solution. The other mobility control agents described above may be effectively employed in amount of between about 0.001 to about 1.0 weight percent.

The amount of the amine provided in the aqueous medium is that amount that causes the reduction in the degradation of the mobility control agent as evidenced by a reduction in the loss of viscosity of the medium as described above. The amount of the amine should be correlated with the amount of any other component added to the medium for the same or similar purposes. For example, if there is added sodium dithionite as an oxygen scavenger, then the function of the amine as an oxygen scavenger is not as critical a feature of its use as is its role of stabilizing the affect of the sodium dithionite addition on the rate of degradation of the water-soluble polymeric mobility control agent. Typically, the amount of the amine ranges between about 0.0001 and 1.0 weight percent of the weight of the aqueous medium containing the mobility control agent.

BRIEF DESCRIPTION OF THE DRAWINGS

FIG. 1 Percent retained viscosity dependence on time in oxygen saturated (8.5 ppm), water-soluble polymer (W-SP) aqueous solutions, 195° F. (90.56° C.):

W-SP: — · — · Acrylamide/acrylic acid copolymer (PAMC from Dow Chemical Co.); — - -, PAMC from Calgon Corp.; - - -, Xanthomonas Campestris polysaccharide from Kelco Corp.; x.x., Hydroxypropyl guar gum from Celanese Corp.;—, Hydroxyethyl cellulose from Union Carbide Corp.

Figure 1:
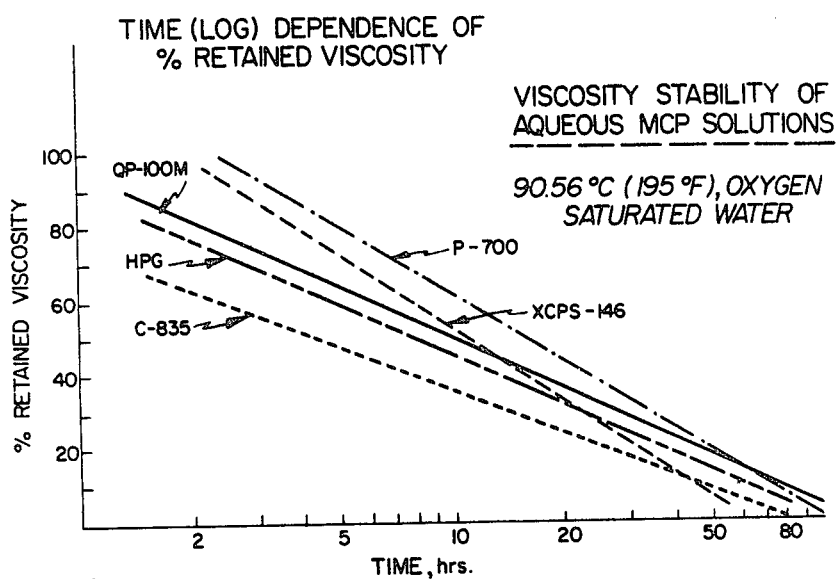
FIGS. 1 through 19 serve to give further illustration of the practice of this invention and the following outlines the matters and legends contained in them.
Figure 2:
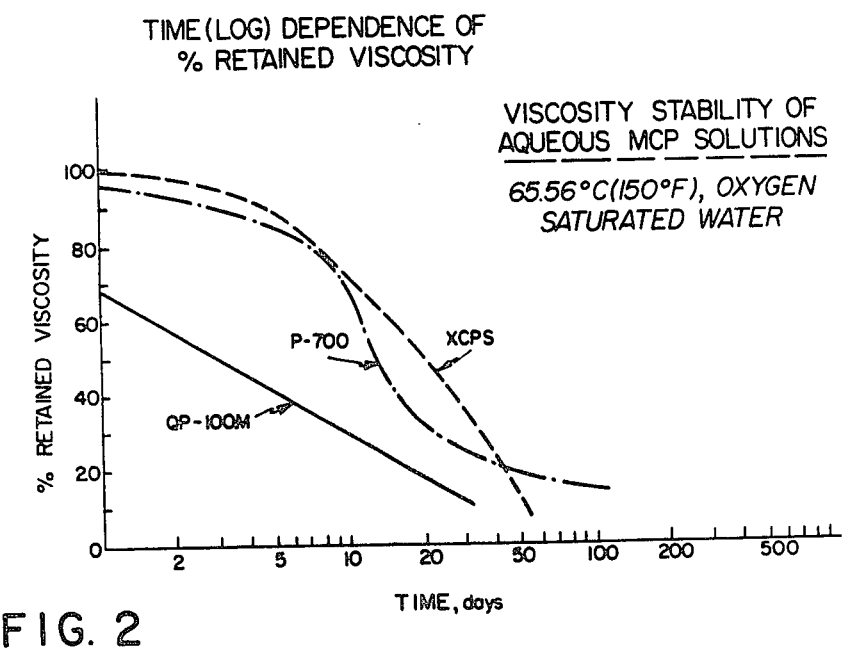

FIG. 2 Percent retained viscosity dependence on time in oxygen saturated (8.5 ppm, water-soluble polymer (W-SP) aqueous solutions, 150° F. (65.56° C.)

W-SP: — · — · PAMC from Dow Chemical Co.; - - -, Xanthomonas Campestris polysaccharide from Kelco Corp.; —, Hydroxyethyl cellulose from Union Carbide Corp.

Figure 3:
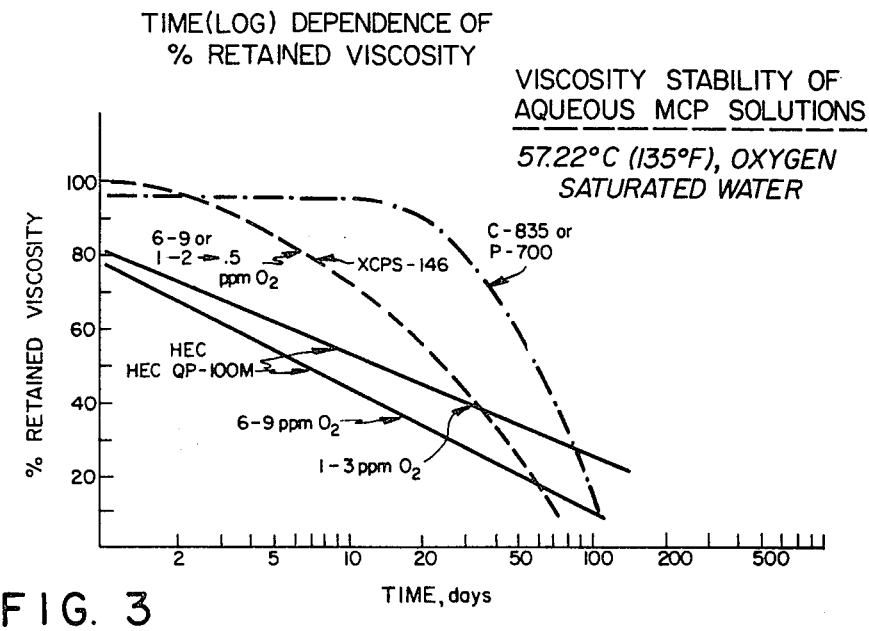

FIG. 3 Percent retained viscosity dependence on time in oxygen saturated (8.5 ppm), water-soluble polymer (W-SP) aqueous solutions, 135° F. (57.22° C.):

W-SP — · — · PAMC from Dow Chemical Co. or Calgon Corp.; - - - -, Xanthomonas Campestris polysaccharide from Kelco Corp.; —, Hydroxyethyl cellulose from Union Carbide Corp.

Figure 4:
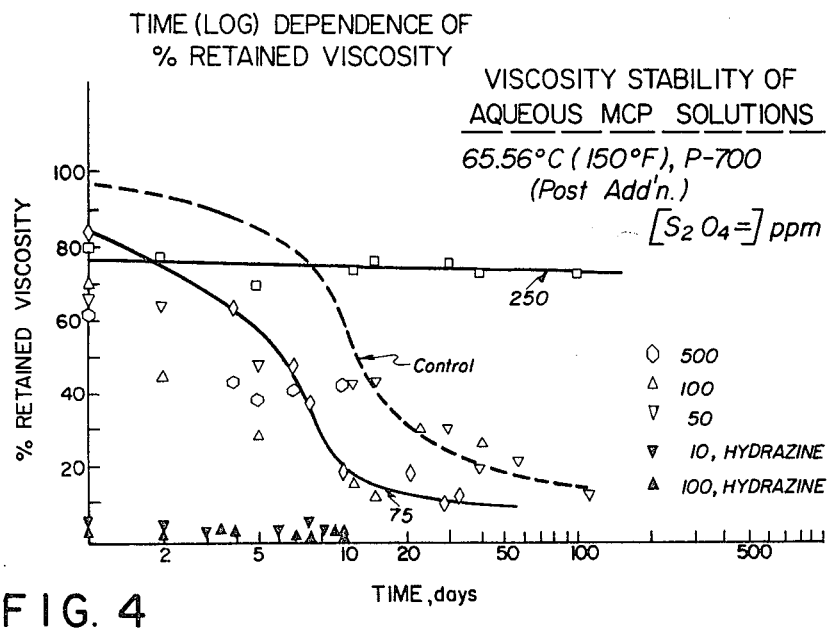

FIG. 4 Percent retained viscosity dependence on time in oxygen saturated (8.5 ppm), acrylamide/acrylic acid copolymer (post-addition) aqueous solutions, 150° F. (65.56° C.)

Additive:
Sodium dithionite—∇, 50 ppm;   75 ppm; Δ 100 ppm; ☐ 250 ppm;   500 ppm
Hydrazine—  10 ppm;   100 ppm FIG. 5 Percent retained viscosity dependence on time in oxygen saturated (8.5 ppm), hydroxyethyl cellulose aqueous solutions, 195° F. (90.56° C.)

Additives (1000 ppm):  , hexaethyleneheptamine;  , tetraethylenepentamine; Δ, triethanolamine; ∇, sodium tripolyphosphate; ☐, ethylenediamine;  , hexamethylenediamine;  , tetrapropylenepentamine;  , 30% sodium chloride.

Figure 6:
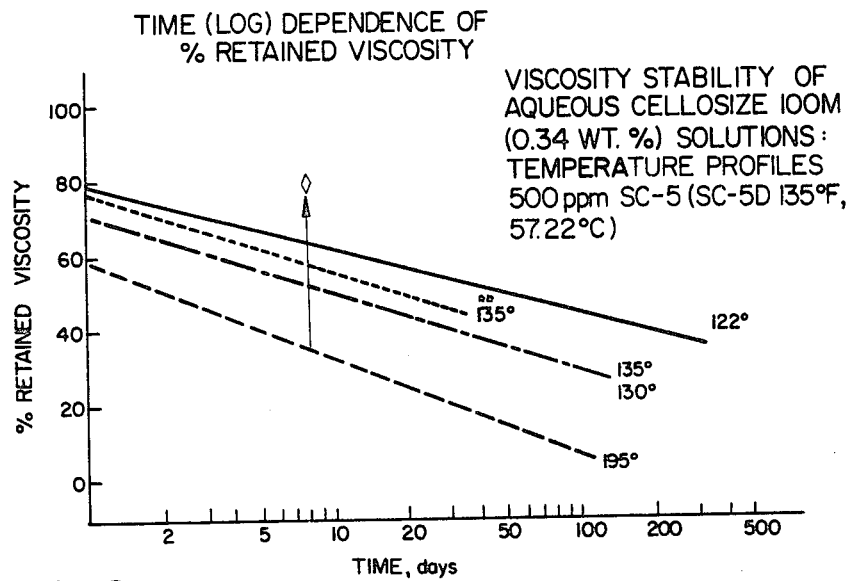

FIG. 6 Percent retained viscosity dependence on time in oxygen saturated (8.5 ppm), hydroxyethyl cellulose (HEC) aqueous solutions.

HEC with 500 ppm hexaethyleneheptamine (HEHA) aqueous solution viscosity loss characteristics as a function of temperature, 135**:HEC with 500 ppm Poly(ethylene imine) (PEI) or pentaethylene hexamine (PEHA)

Figure 7:
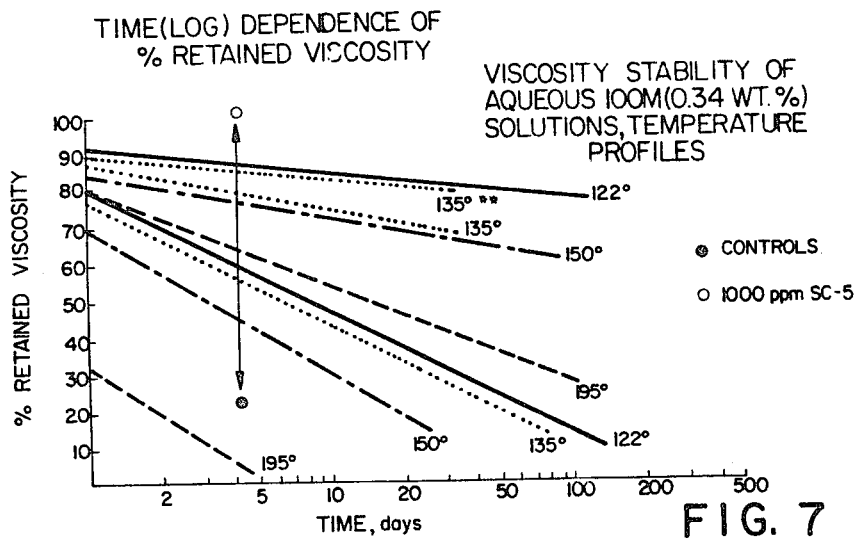

FIG. 7 Percent retained viscosity dependence on time in oxygen saturated (8.5 ppm), hydroxyethyl cellulose (HEC) aqueous solutions:

0:HEC aqueous solution viscosity loss characteristics as a function of temperature.
:HEC with 1000 ppm hexaethyleneheptamine (HEHA) aqueous solution viscosity loss characteristics as a function of temperature. 135**:HEC with 1000 ppm PEI or PEHA.

Figure 8:
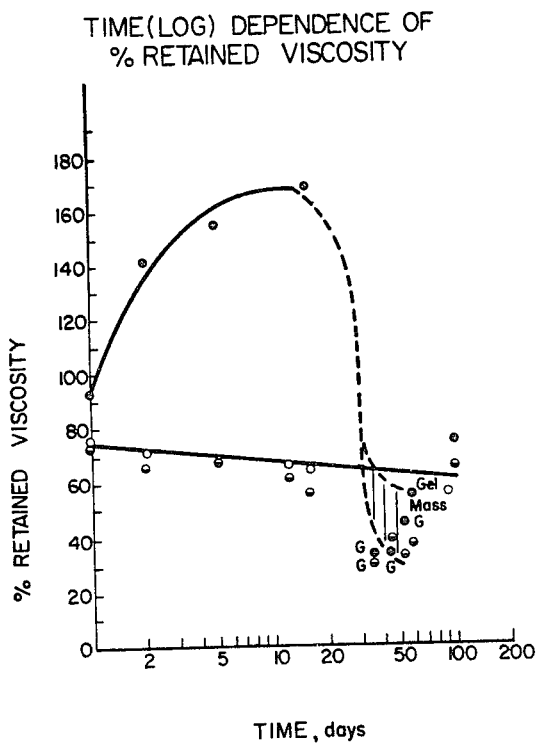

FIG. 8 Percent retained viscosity dependence on time in oxygen saturated (8.5 ppm), water-soluble polymer (W-SP) aqueous solutions with 1000 ppm hexaethyleneheptamine, 150° F. (65.56° C.)

W-SP:  , Hydroxyethyl cellulose,  , Hydroxypropyl guar gum,  , Xanthomonas Campestris polysaccharide.

Figure 9:
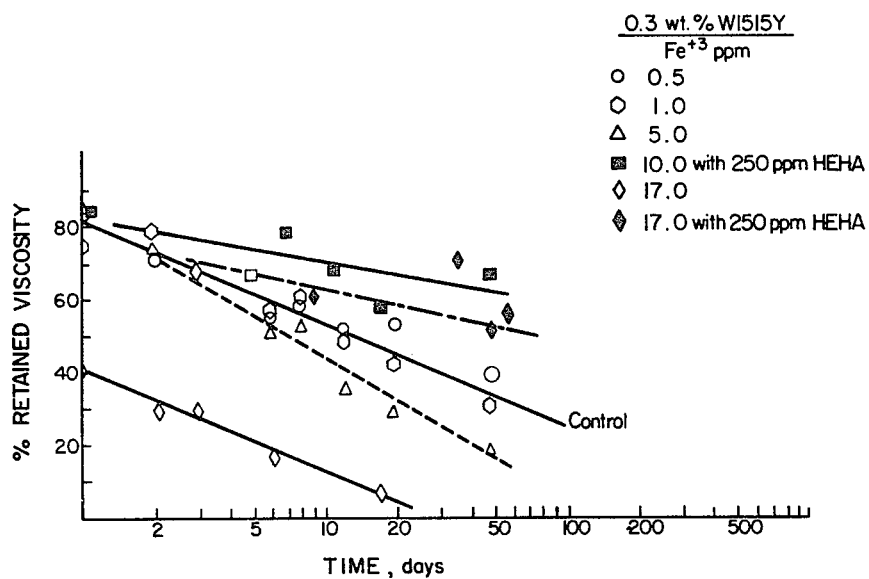

FIG. 9 Percent retained viscosity dependence on time in low oxygen (∼1.0 ppm) hydroxyethyl cellulose aqueous solutions, 135° F. containing ferric ion at:
 , 0.5 ppm;  , 1.0 ppm: Δ, 5.0 ppm;  , 10.0 ppm with 250 ppm HEHA;  , 17.0 ppm;  , 17.0 ppm with 250 ppm HEHA. (The 10 ppm without HEHA lost 80% of original viscosity at room temperature.)

Figure 10:
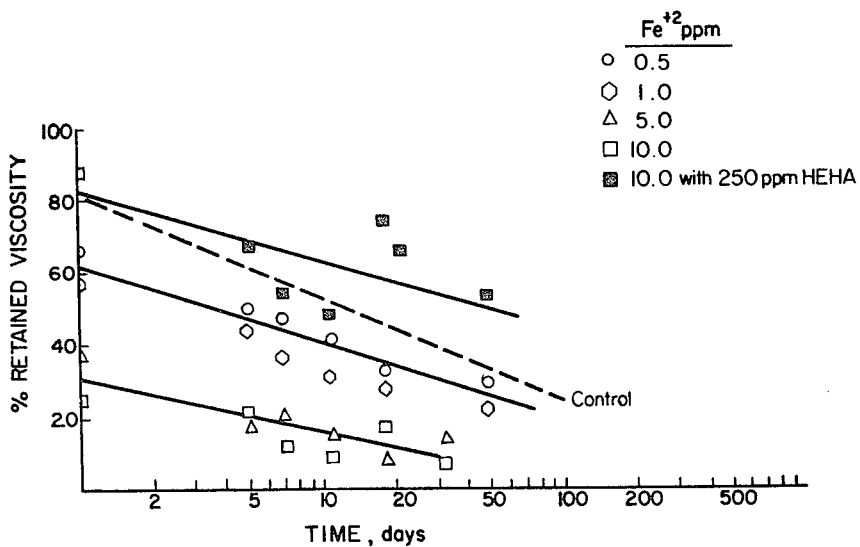

FIG. 10 Percent retained viscosity dependence on time in low oxygen (∼1.0 ppm) hydroxyethyl cellulose aqueous solutions, 135° F., containing ferrous ion at:
 , 0.5 ppm;  , 1.0 ppm; Δ, 5.0 ppm;  , 10.0 ppm, 10.0 ppm with 250 ppm HEHA.

Figure 11:
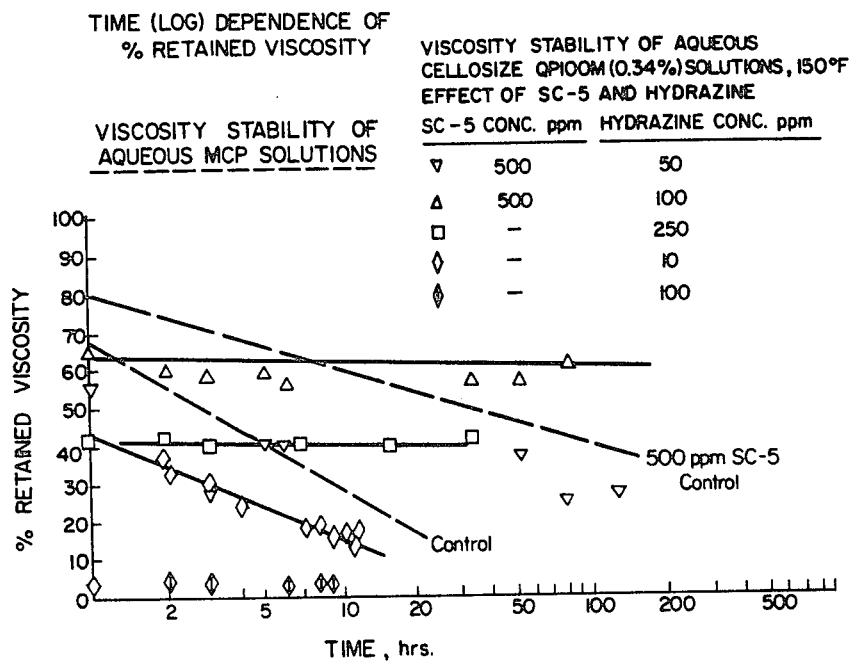

FIG. 11 Percent retained viscosity dependence on time in oxygen saturated (8.5 ppm), hydroxyethyl cellulose aqueous solutions, 150° F. (65.56° C.):

Additives:  , 10 ppm Hydrazine (Hz);  , 100 ppm Hz;  , 50 ppm Hz, 500 ppm HEHA:  , 100 Hz, 500 HEHA;  , 250 Hz, 500 HEHA.

Figure 12:
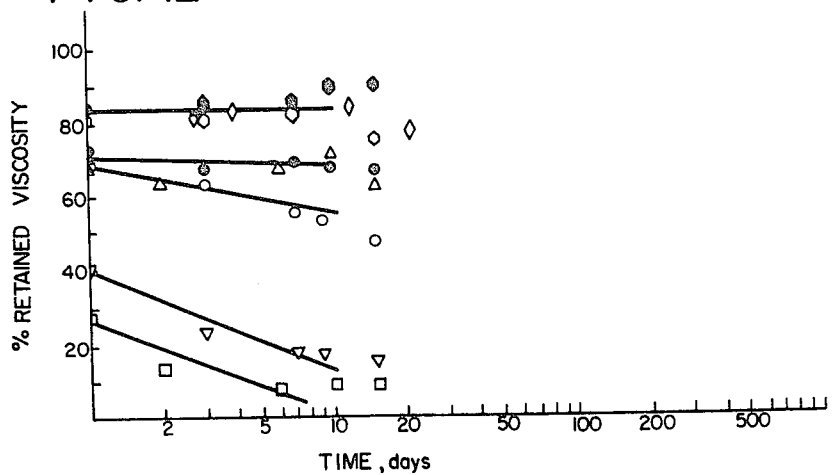

FIG. 12 Percent retained viscosity dependence on time in low oxygen (∼1 ppm), pre-addition hydroxyethyl cellulose aqueous solutions, 72° F. (22.22° C.):

Post-addition additives, slurry addition: 5 ppm $Na_2S_2O_4$ with 300 ppm:
 , ethylene diamine;  , tetraethylene pentamine (TEPA);
 , ethanolamine; •, triethanolamine; Δ, tetrapropylene pentamine;
∇, hexamethylenediamine;  , magnesium oxide.
 , 25 ppm $Na_2SO_3$ with 300 ppm TEPA.

Figure 13:
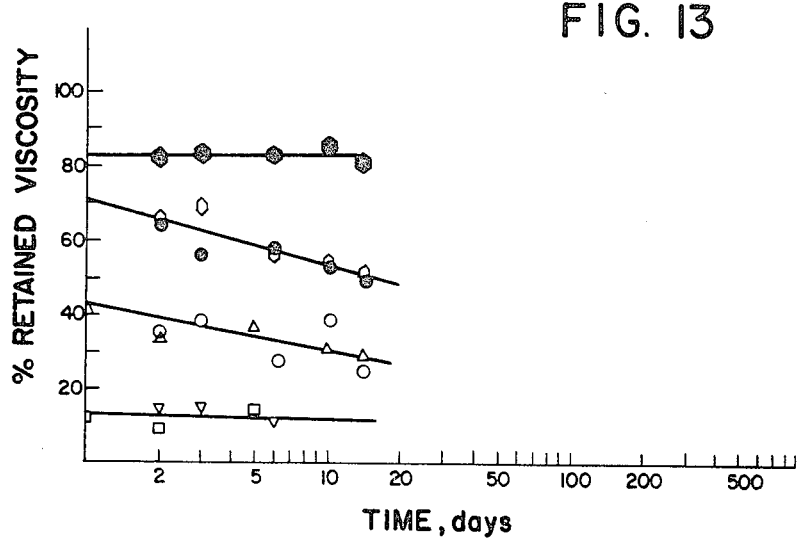

FIG. 13 Percent retained viscosity dependence on time in low oxygen (∼1 ppm), pre-addition hydroxyethyl cellulose aqueous solutions, 135° F. (57.22° C.):

Post-addition additives, slurry addition:
5 ppm $Na_2S_2O_4$ with 300 ppm:
  ethylene diamine;  ,
  tetraethylenepentamine (TEPA);
 , ethanolamine; •, triethanolamine; Δ, tetrapropylenepentamine;
∇, hexamethylenediamine; ☐, magnesium oxide.

Figure 14:
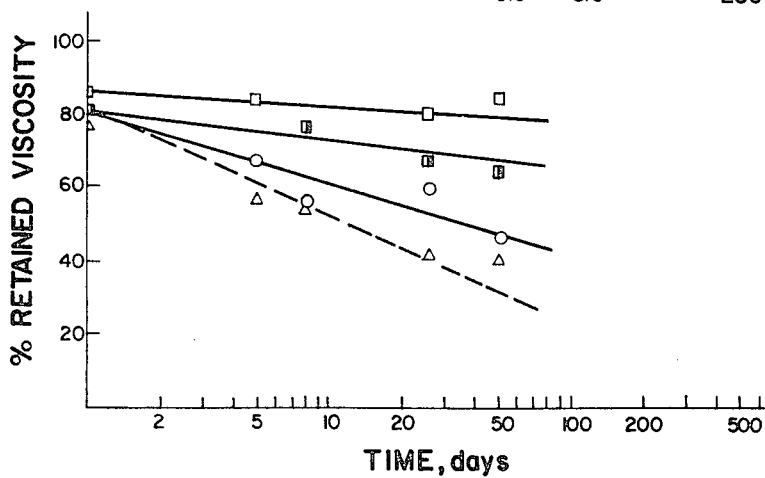

FIG. 14 Percent retained viscosity dependence on time in low oxygen (∼1.0 ppm) hydroxyethyl cellulose aqueous solutions, 135° F., containing mixed additives:
 , 5.0 ppm $Na_2S_2O_4$, 250 ppm CaO; Δ, 5.0 ppm $Fe^{+2}$, 5.0 ppm $Na_2S_2O_4$, 250 ppm CaO;  , 5.0 ppm $Fe^{+2}$, 5.0 ppm $Na_2S_2O_4$, 125 ppm CaO; 125 ppm TEPA; ☐, 5.0 ppm $Fe^{+2}$, 5.0 ppm $Na_2S_2O_4$, 250 ppm TEPA.

Figure 15:
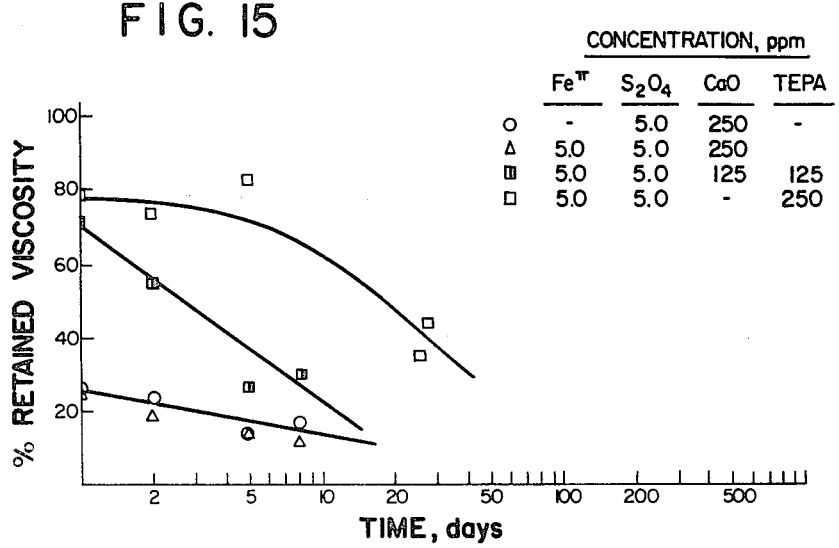

FIG. 15 Percent retained viscosity dependence on time in low oxygen (∼1.0 ppm) hydroxyethyl cellulose aqueous solutions, 195° F. containing mixed additives:
 , 5.0 ppm $Na_2S_2O_4$, 250 ppm CaO; Δ, 5.0 ppm $Fe^{+2}$, 5.0 ppm $Na_2S_2O_4$, 250 ppm CaO;  , 5.0 ppm $Fe^{+2}$, 5.0 ppm $Na_2S_2O_4$, 125 ppm CaO; 125 ppm TEPA; ☐, 5.0 ppm $Fe^{+2}$, 5.0 ppm $Na_2S_2O_4$, 250 ppm TEPA.

Figure 16:
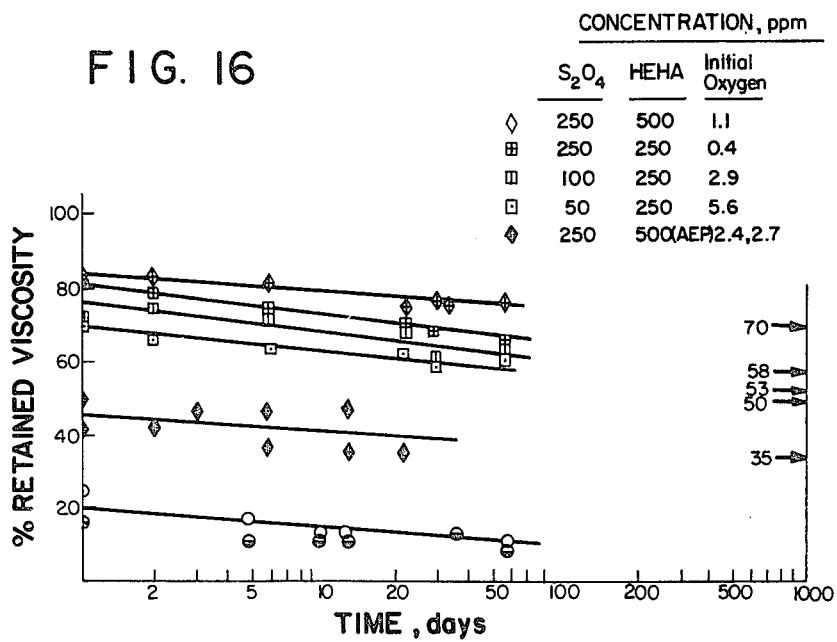

FIG. 16 Percent retained viscosity dependence on time in oxygen saturated (8.5 ppm), hydroethyl cellulose aqueous solutions, 135° F.:

Mixed Additives:  , 250 ppm $Na_2S_2O_4$ (DT), 500 hexaethylene heptamine (HEHA);  , 250 ppm DT, 250 ppm HEHA;  , 100 ppm DT, 250 HEHA; ☐, 50 ppm DT, 250 ppm HEHA;  , 250 DT, 500 aminoethylpiperazine;  , 50 ppm DT, alone;  , 100 ppm DT, alone.

Figure 17:
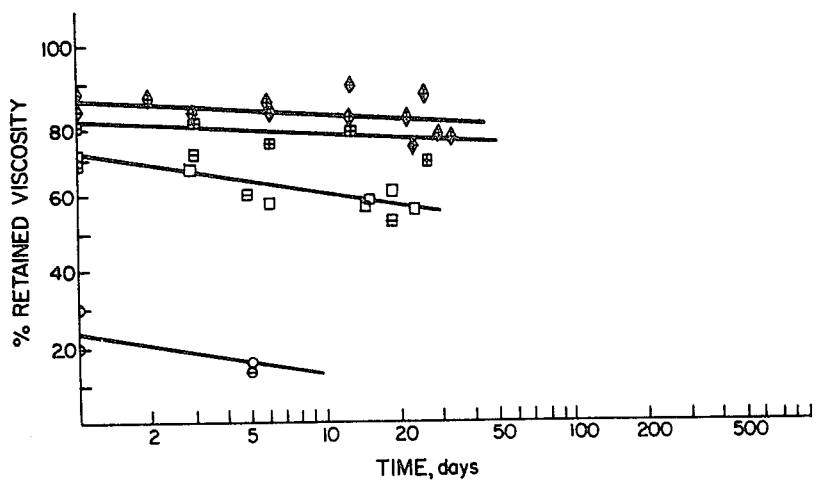

FIG. 17 Percent retained viscosity dependence on time in oxygen saturated (8.5 ppm), hydroxyethyl cellulose aqueous solutions, 135° F.:

Mixed Additives: , 250 ppm, Na₂SO₃(SS), 500 ppm HDHA, , 250 ppm SS, 250 ppm HEHA, , 250 ppm DT, 125 ppm Boric Acid, 125 ppm Sodium Borate buffer; , 100 ppm 250 ppm DT, 250 ppm Boric Acid, 250 ppm Sodium Borate buffer.

Nitrogen purged aqueous solutions, aqueous solution oxygen ca. 1 ppm:
  Additives: , 50 ppm SS, 250 ppm HEHA; , 10 ppm SS, 250 ppm HEHA.

Figure 18:
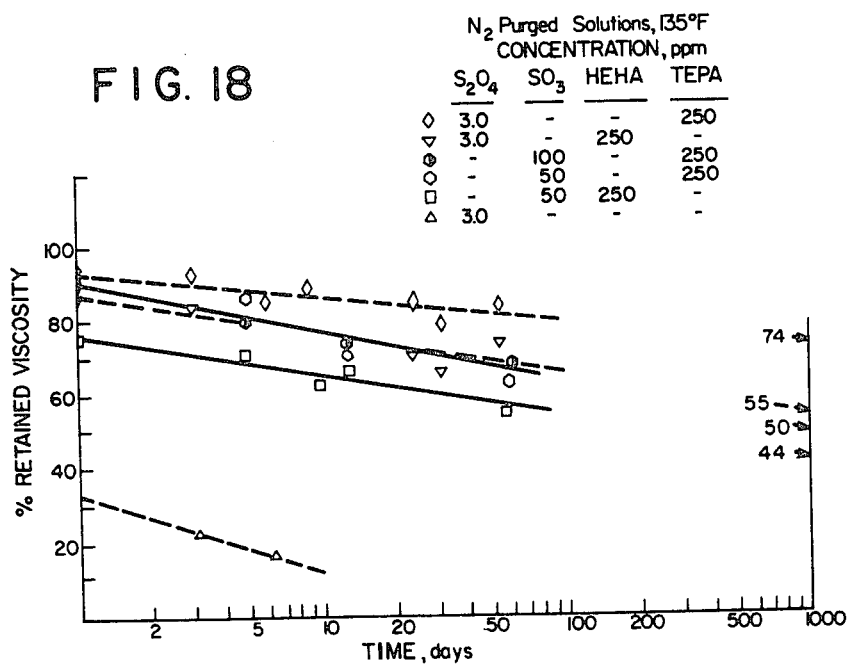

FIG. 18 Percent retained viscosity dependence on time in low oxygen (ca. 1 ppm) hydroxyethyl cellulose aqueous solutions, 135° F.:
  Mixed Additives: , 3 ppm DT, 250 TEPA; ∇, 3.0 DT, 250 HEHA; , 100 ppm SS, 250 TEPA; , 50 ppm SS, 250 TEPA; □, 50 ppm SS, 250 HEHA; △, 3 ppm DT, alone.

Figure 19:
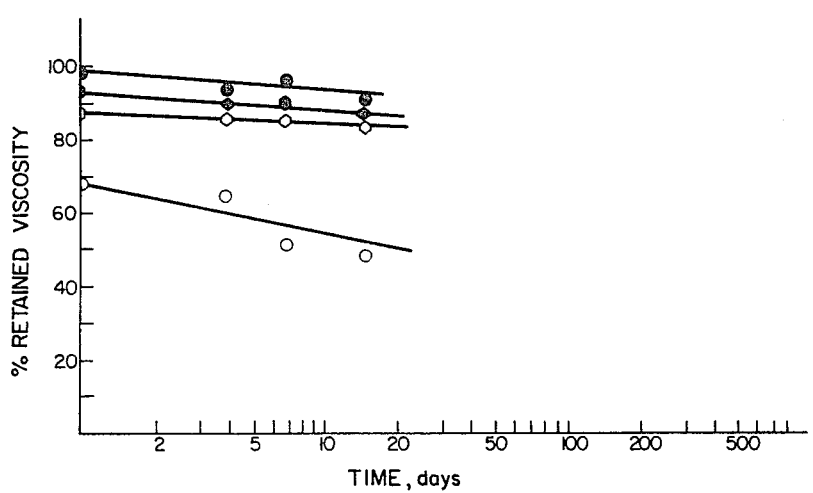

FIG. 19 Percent retained viscosity dependence on time in low oxygen (ca. 1 ppm) hydroxyethyl cellulose aqueous solutions, 135° F.:
  Mixed Additives: , , 5 ppm DT, 300 ppm TEPA; , , 5 ppm DT, 300 ppm triethanolamine
  W-S Polymer: Closed symbols, acrylamide/acrylic acid copolymer; Open symbols, hydroxyethyl cellulose.

The degree of confidence that can be expected in stabilizing viscosities of an aqueous solution of a water-soluble polymeric mobility control agent via the prior art is reflected in the dithionite studies in FIG. 4. For example 75 ppm of sodium dithionite is capable of removing 8.5 ppm of dissolved oxygen, yet the solution viscosities of the polymer thickened fluid are below those of the acrylamide/acrylic acid copolymer solutions where no attempt at stabilization was made. Only one of the five stabilization efforts resulted in adequate long-term solution viscosities. This is due primarily to the difficulty of dissolving the polymers without reintroducing oxygen into the solution, and to a lesser extent, to trace amounts of metal ions in all polymers. Hydrazine also was investigated in this study. Hydrazine will scavenge oxygen from aqueous solutions and has been disclosed as a corrosion inhibitor for boilers (U.S. Pat. No. 3,983,048) via this mechanism. Polymer degradation was observed to be very rapid with this scavenger.

In the studies wherein stabilization was not attempted, the polysaccharides [the biosynthesis product from Xanthomonas Campestris (XCPS) and hydroxyethyl cellulose (HEC)] exhibited greater instability at the lower temperatures than the acrylamide/acrylic acid copolymer (PAMC). Polysaccharides contain multiple acetal units subject to acid hydrolysis. Consequently, in the static laboratory solutions, autoaccelerative degradation could have accounted for the greater instability noted. Initial acid generation could occur through oxygen extraction of the hydrogen bonded to the carbon of the acetal linkage. To combat the acid hydrolysis autoacceleration possibility, a polymeric base, poly(ethylene imine) (PEI), was added to polysaccharide solutions. The improved stability, i.e. solution viscosities, noted when PEI was employed at 500 and 1000 ppm was far greater than might have been expected by interpretation of academic studies [Brandon, R. E., et. al., *ACS Symp. Ser.*, 10, (1975); Aspinall, G. O., *Biochem. Soc. Symp.*, 11, 42 (1953); Major, W. D., Tappi, 41, 530 (1958); Kuzmina, O. P., *J. Polym. Sci.*, C16, 4225 (1968)] on carbohydrate decomposition rates at elevated temperatures. The use of PEI improved viscosity stabilities of PAMC aqueous solutions, which were proportional, with little reproducibility variance, to the amount of additive used. During these studies it was observed that the dissolved oxygen content decreased as the amount of PEI was increased.

Figure 5:
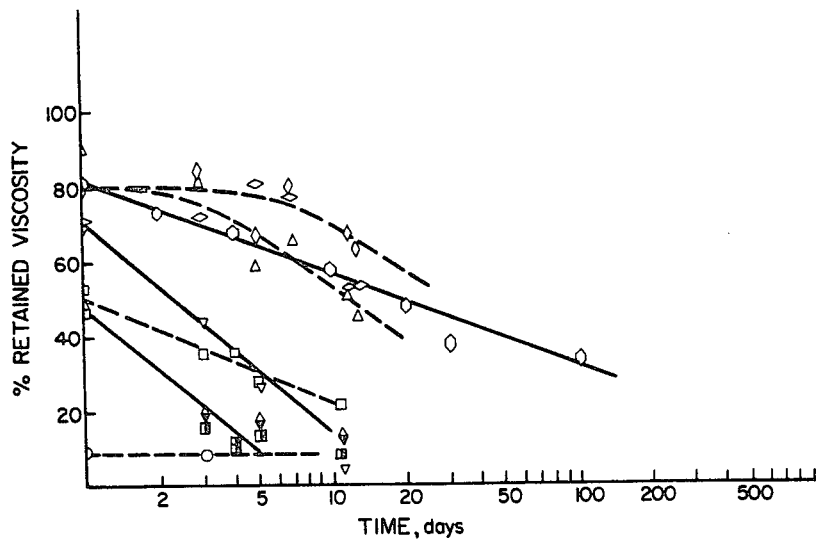

Another screening test (1000 ppm additive in aqueous, oxygen saturated solutions at 195° F.—Table I) showed a general agreement between the screening results and the ability of the additives to stabilize aqueous HEC solution viscosities (FIG. 5). Solution pH control has been found an insufficient criteria

TABLE I

ADDITIVE EFFECT ON PERCENT OXYGEN REMOVED FROM AQUEOUS SOLUTIONS

| ADDITIVE[a] | Solution pH° (72° F.)[e] | % Oxygen Removed[d] in 24 hrs. at | | | |
|---|---|---|---|---|---|
| | | 72°[e] | 104°[e] | 135°[e] | 195°[e] |
| Urea | 7.3 | 0 | — | — | 0 |
| Formaldehyde | 6.9 | ~0 | 0 | 0 | <10 |
| 10% Sodium Chloride | 7.1 | — | — | — | 13 |
| 15% Sodium Chloride | 7.1 | — | — | — | ~21 |
| Sodium Tripolyphosphate | 9.5 | 0 | 0 | — | <10 |
| Ethylenedinitrilo-tetracetic acid | 3.5 | 0 | — | — | 0 |
| Ethylenedinitrilo-tetracetic acid, tetrasodium salt | 10.5 | — | — | — | 0 |
| Triethanolamine[b] | 9.8 | 0 | 0 | | 41 |
| Aminoethylpiperazine | 8.0 | 0 | 0 | | 22 |
| N—Methyl Morpholine | 8.0 | 0 | 0 | | <10 |
| Hydroxylamine Hydrochloride | 6.9 | | 10 | 20 | 39 |
| Ethylenediamine | 10.8 | 0 | 0 | | 19 |
| Diethylenetriamine[b] | 10.7 | 0 | 8 | 52 | 90 |
| Tetraethylenepentamine[b] | 10.5 | 0 | 21 | 55 | 81 |
| Pentaethylenehexamine[b] | 10.6 | 9 | 21 | 57 | 83 |
| Hexaethyleneheptamine[b] | 10.4 | 33 | 60 | 90 | 90 |
| 1,6 Hexamethylenediamine | 9.6 | — | — | | <10 |
| Tetrapropylenepentamine[b] | 11.0 | 0 | <10 | | 32 |
| Poly(ethylene imine) | 8.5 | 10 | 20 | 60 | 75 |

[a] 1000 ppm unless otherwise indicated.
[b] Predominant component in complex mixture.
[c] pH (initial water) = 5.7.
[d] ≈ 8% error in measurements.
[e] 22.22° C. (72° F.); 40° C. (104° F.); 57.22° C. (135° F.); 90.56° C. (195° F.)

for estimating significant, long-term improvements in solution viscosity stabilities. A primary criteria that can be used for estimating the significance of additives to effect long-term solution viscosity stability improvements is reflected in FIG. 5. For example, in oxygen saturated, hydroxyethyl cellulose thickened aqueous solutions, those additives which effect approximately 70% or greater retention of the original viscosity after 24 hours at 195° F. (90.56° C.) solution temperatures, and wherein the rate of viscosity loss during the first ten day interval is approximate to or less than 30% can be expected to impart a significant stabilizing influence under an actual well bore test.

Based upon the greater oxygen scavenging ability (Table I) and good performance in HEC solution viscosity studies, hexaethylene heptamine (HEHA) was examined in greater detail. Over a broad temperature range, 500 ppm (FIG. 6) and 1000 ppm (FIG. 7), HEHA was noted to significantly improve the viscosity stability of HEC solutions beyond that noted in the absence of the additive (FIG. 7). The addition of HEHA also was observed to impart the same degree of stability in other carbohydrates (FIG. 8) in fresh or brine solutions and to synthetic water-soluble polymers such as PAMC. The unusual viscosity increase with XCPS is probably associated with its slight polyelectrolyte and complex biological solution characteristics.

In a period of thirty to fifty days, gels are observed in the stabilized carbohydrate thickened solutions with an associated drop in solution viscosity. Gels are not observed in the PAMC-HEHA solutions. The crosslinking of carbohydrate chains via decomposition product group, i.e., aldehyde and acids and reactions with amine, are the probable cause of the gelation phenomenon. As such, the phenomenon has potential as a time dependent flow diversion technique. There are many disclosures on flow diversion agents in the area of the well-bore, but few (e.g. U.S. Pat. No. 3,926,258) pertaining to time dependent reactions which function beneficially far beyond the well site to inhibit "line-driving," i.e. channeling, between injection and producing wells. In separate studies it was observed that gelation is shear rate dependent. Consequently, the phenomenon can be inhibited by increasing the frontal velocity of a subterranean sweep; an application condition that is not detrimental to polysaccharide performance because of their shear-stability solution characteristics [Maerker, J. M., Soc. Pet. Eng. J., 259, II-311 (1975)].

The stabilizing influence of the amines is not as straight forward as presented above. For example, some stabilizers at 250 ppm scavenge dissolved oxygen, but notable solution viscosity improvements are not always observed. Significant viscosity improvements are observed at 500 ppm with amines which readily scavenge dissolved oxygen at 250 ppm, and viscosity stabilities approximating mobility control buffer requirements are observed over a broad temperature range at 1000 ppm. The relationships appear to be qualitatively exponential; little added stability is observed at a 2000 ppm concentration levels. It also is observed that some amines, e.g. tetrapropylenepentamine, hexapropyleneheptamine, etc. scavenge dissolved oxygen (to <1 ppm) slowly and are not as effective stabilizers even at 1000 ppm concentrations. Subsequent studies indicate other important contributions of amine stabilizers to the attainment of long-term aqueous solution viscosities.

Generally, amines are observed to be effective in sequestering the activity of transition metal ions in solution. For example, in solutions wherein the dissolved oxygen content has been lowered (to ca. 1 ppm) by nitrogen purging, ferric ion at concentrations above 5 ppm accelerates (FIG. 9) the rate of viscosity loss in HEC solutions; ferrous ion (above 0.5 ppm concentrations—FIG. 10) are even more detrimental to polymer stability. However, at a HEHA concentration of 250 ppm, both iron valence states to be expected in aqueous solutions are sequestered thereby eliminating their degradation activities at high concentration levels.

The success of the amines also are due in part to their ability to protect water soluble polymers in solution from degradation by the more reactive oxygen scavengers, i.e. dithionite, sulfite, bisulfite, hydrazine, etc., in the presence of trace amounts of oxygen. The ability of the amines to moderate the degradative activity of primary oxygen scavengers can be observed in studies utilizing hydrazine (FIG. 11). Hydrazine is very effective in degrading PAMC (FIG. 4) and HEC (FIG. 11) in aqueous solution. However, investigations denoted a stabilizing influence of HEHA in moderating the activity of hydrazine. Although the percent retained viscosities were somewhat erratic in preliminary studies (FIG. 11), synergistic effects over certain component ratios and amounts were observed, particularly with respect to the use of either "stabilizing" component alone. Subsequent studies of HEHA/dithionite combinations provided similar synergistic stabilities in both HEC and PAMC solutions.

The moderating influence of the amines on the more reactive primary oxygen scavengers can be seen in application of the formulations to polymer-preaddition solutions (Table II and FIG. 12). It is well-recognized in the art of polymer waterflooding that addition of an oxygen scavenger, e.g. dithionite, sulfite, etc., to a thickened solution with traces of dissolved oxygen will result in rapid degradation of the solubilized W-S polymer. Specifically it is taught that "it is imperative that hydrosulfite (i.e. dithionite) be added to water before polymer is added" (Knight, supra) and "it is best, however, to incorporate the hydrosulfite additive prior to the addition of the polymeric additive" (Pye, U.S. Pat. No. 3,343,601). These aspects of mobility control buffer technology are confirmed by the data in Table II. To minimize solution viscosity losses, the current art practices the addition of a reactive oxygen scavenger to aqueous solutions prior to water soluble polymer addition, in an amount anticipating, with a slight excess, the concentration of oxygen to be reintroduced with polymer dissolution. The problem of minimizing oxygen reintroduction and redox degradation of the water-soluble polymer being dissolved is ever present and a serious deficiency of the practiced art.

One of the positive aspects of the current invention is the moderating effect of the amines on primary oxygen scavengers. This observation permits preadditions of the water soluble polymer without significant later degradation when the primary scavengers are added in a premixed slurry or solution with the amines. Comparative performances at 22.22° C. (72° F.) and 57.22° C. (135° F.), of preaddition solutions prepared at ambient temperatures, are illustrated in FIGS. 12 and 13, respectively. The performance capability of amines to eliminate or minimize the viscosity losses of water-soluble polymer aqueous solutions is defined in FIG. 12, i.e. those which effect at least 60% viscosity retention after 24 hours with less than 30% viscosity loss during the following 10 days. The product of selection would be dependent upon economic factors and upon the care taken to exclude the contaminants influencing thickener degradation. The preferred materials of this invention are defined by the same criteria, but under more strenuous conditions, i.e. 57.22° C. (135° F.), solution temperatures (FIG. 13).

TABLE II

VISCOSITY STABILITY OF PRE-ADDITION[b] HYDROXYETHYL CELLULOSE AQUEOUS SOLUTIONS

| Initial HEC Solution Conditions | | Post-addition[b] primary oxygen scavenger slurry compositions (ppm[c]) | | | Time Dependent Post-Addition Solution Viscosities[a] (cps). 72° F. | | | | | |
|---|---|---|---|---|---|---|---|---|---|---|
| viscosity, cps | oxygen, ppm | $YS_2O_4^=$ | $YSO_3^=$ | TEPA | 6 hrs. | 16 hrs. | 72 hrs. | 96 hrs. | 120 hrs. | 288 hrs. |
| 99 | 0.2 | 5 | — | — | 90 | 84 | 68 | 62 | — | 37 |
| 99 | 0.2 | 5 | — | 300 | 93 | — | 78 | 80 | — | 80 |
| 99 | 0.7 | 10 | — | — | 77 | — | 48 | 45 | — | 27 |
| 93 | 0.4 | — | 25 | — | — | 49 | — | — | 23 | 10 |

TABLE II-continued
VISCOSITY STABILITY OF PRE-ADDITION[b] HYDROXYETHYL CELLULOSE AQUEOUS SOLUTIONS

| 91 | 0.5 | — | 25 | 300 | — | 93 | 82 | 83 | — | 83 |

| | | | | | RESIDUAL OXYGEN FROM INTENTIONAL LEAKAGE | VISCOSITY AFTER SECONDARY OXYGEN LEAKAGE, 135° F. | | | |
|---|---|---|---|---|---|---|---|---|---|---|
| | | | | | | | 16 hrs. | 24 hrs. | 144 hrs. | 192 hrs. |
| ~92 | ~1.0 | 5 | — | — | 3.6 | | 86 | 85 | 12 | 10 |
| ~92 | ~1.0 | 5 | — | 300 | 4.1 | | 90 | 89 | 66 | 65 |
| ~92 | ~1.0 | — | 25 | — | 3.6 | | 35 | 36 | — | — |
| ~92 | ~1.0 | — | 25 | 300 | 2.9 | | 92 | 92 | 69 | 66 |

[a]Viscosities measured at 6 rpm spindle speed, 72° F. with Model LVT Brookfield Viscometer with HL adapter.
[b]Primary oxygen scavenger slurried in TEPA was added to HEC thickened water under a nitrogen atmosphere.
[c]Based on total weight of solution.

Pre-addition of water-soluble polymers possessing good dispersing characteristics in substantially neutral pH solutions facilitates good dissolution of such materials, with less applied shear to solubilize the polymer. Better dissolution with many types of water-soluble polymers generally means fewer gel structures in solution and less strenuous criteria for filtration of the thickened solutions.

In an effort to affect lower cost formulations, other components can be considered for achieving aqueous water-soluble polymer solution viscosity stabilities. Calcium oxide and sodium dithionite in combination appear to improve long-term solution viscosity stabilities, presumably via pH and oxygen control, but this improvement may be effected by the presence of ferrous ion (FIG. 14).

Implementation of the mixed formulation with tetraethylenepentamine (TEPA) significantly improves solution viscosities (projected 58% retained viscosity at 3 years). However, a dithionate formulation employed with a higher TEPA level is effective in achieving very high stabilities [projected 74% retained at 3 years, 57.22° C. (135° F.), see FIG. 14)]. These data and those noted with the same formulations at 195° F. (FIG. 15) denote the importance of interactions between dissolved oxygen, transition metal ions and temperature in stabilizing solution viscosities, and of the importance of the stabilizer in dealing with the variables in a concerted manner.

The amount of the amines required to achieve optimum aqueous water-soluble polymer solution viscosity stability is dependent upon the interactions discussed above. As such, the amount of the amine is dependent upon the dissolved oxygen concentration and the means employed to achieve that level. For example, in large-scale water-floods, aqueous solutions are often deaerated by gas stripping or vacuum deaeration techniques (Carlberg, B. L., Soc. Pet. Eng. Paper No. 6096). If a technique of this nature is employed, the oxygen concentration of the aqueous solution to which the water-soluble polymer is to be added will be low. Essentially only the oxygen re-introduced through polymer dissolution will be present. Therefore, less amine will be required than would be necessary in smaller field-trial polymer flooding wherein it is often more economical to deoxygenate aqueous solutions by purely chemical moethds. The latter approach requires the use of larger quantities of a primary oxygen scavenger and thus will require higher concentrations of the amines to achieve the proper activity moderation, which in part is also dependent upon the total amount of dissolved oxygen and transition metal ions present after dissolution of the water-soluble polymer. These effects are illustrated in FIG. 16, wherein dithionite is employed as the primary oxygen scavenger.

In special tests employing high concentration dithionite studies, it was noted that approximately 70 to 90 ppm of soduum dithionite depleted ambient aqueous solutions of dissolved oxygen. In the studies illustrated in FIG. 16, initial oxygen concentrations of 5.6, 2.9, 0.4 and 1.1 were achieved with increasing dithionite and HEHA concentrations, respectively. These discrepancies with respect to the nonthickened concentration studies are associated with reintroduced oxygen levels during polymer dissolution. Projected three-year aqueous solution viscosity stabilities are 48, 54, 58 and 69 percent, respectively. HEHA, containing comparatively high initial oxygen concentrations (5.6 ppm), is capable of outperforming aminoethylpiperazine solutions with a lower initial oxygen level, i.e., 2.4 ppm.

Similar observations are observed when sulfite is used at high concentrations as the primary oxygen scavenger (FIG. 17). Independent studies in non-thickened solutions indicate a level of 150 ppm of sodium sulfite is required to deplete ambient aqueous solutions of dissolved oxygen. Projected three-year stabilities of 70 and 60% viscosity retention are observed using the high concentration sulfite anion amine mixed formulation approach. When the sulfite mixtures are complemented by prior nitrogen purging to lower the initial dissolved oxygen content, lower stabilities are obtained approximating the lower dithionite/HEHA mixed formulation projected stabilities at a three-year period. These comparative studies highlight the synergistic relationship wherein greater stabilities are observed with certain compositional ratios of primary to amine stabilizers than are obtained by using either type of stabilizer separately.

As suggested in earlier screening comparisons, some amines perform better than others. Comparative differences between two effective amine stabilizers are evident in FIG. 18 in systems wherein sulfite is employed as the primary oxygen scavenger, and in dithionite compositions wherein the solution had been previously purged with nitrogen. Although HEHA was observed to be a more efficient oxygen scavenger, TEPA implemented better solution viscosity stabilities at elevated temperatures, and these earlier differences are reflected in FIG. 18. This may be due to more efficient coordinating efficiency, i.e., greater equivalent reactivity per mole, consistent with stereochemical restrictions of the various components to sequester transition metal ions or some other mechanistic feature peculiar to the structural aspects of the lower molecular weight material. In these latter studies, the use of non-transition metal oxides, as lower-cost pH control reagents, are effective, in part, in stabilizing water-soluble polymer aqueous solution viscosities against primary oxygen scavenger degradation of polymer viscosities in the presence of trace amounts of oxygen. However, as indicated earlier they are not as effective as the amine approach even without the intentional contamination of solutions with ferrous ion.

The performance of the amines in minimizing solution viscosity losses is dependent upon the parameters discussed above and upon the water-soluble polymer used as the mobility control agent. Comparative differences of acrylamide/acrylic acid (PAMC) and hydroxyethyl cellulose (HEC) with tetraethylene pentamine (TEPA) and triethanolamine (TEOA) are illustrated in FIG. 19. As reflected in earlier graphs TEOA is less forgiving of trace amounts of oxygen in a dithionite environment. Interacting with these variables is possibly the higher iron content in the HEC solution because of the higher concentrations used in fresh water solutions. The interaction of these variables with temperature is very important and care with higher amine concentrations must be employed at higher solution temperatures.

While not wishing to be bound by any theory or explanation, it is believed that the method of employing the amines alone or in combination with lower-cost primary oxygen scavengers and/or lower-cost solution pH control reagents is an effective means of obtaining long-term solution water-soluble polymer viscosities because of the unique, concerted modes by which the amines effectively negate the various mechanisms of polymer decomposition in solution. The amines are effective in removing residual solution oxygen levels, introduced during polymer dissolution, effectively sequestering transition metal ions from coordinating with residual oxygen levels to accelerate polymer degradation and in maintaining alkaline pH solutions to inhibit biological degradation under aerobic conditions. In addition, the amines are effective in moderating the activity of primary oxygen scavengers in the presence of dissolved oxygen. Various components employed to maintain pH solution control or scavenged oxygen are effective in part in obtaining some degree of solution viscosity stability, particularly at lower solution temperature; however, the amines are more effective and far more forgiving of mischarges or mishandling of solutions. Surprisingly, it is observed that the amines, in combination with primary oxygen scavengers and/or solution pH control reagents, provide formulations for obtaining greater long-term stability than observed through utilization of the individual components.

EXPERIMENTAL PROCEDURE

The synthetic water-soluble polymers evaluated in this study were acrylamide/acrylic acid copolymers (Pusher®700—Dow Chemical, Polymer 835—Calgon Corp.), poly(ethylene oxide) (POLYOX®-WSR 301, Union Carbide Corp.) and a laboratory synthesized acrylic acid/acrylate ester terpolymer. Water-soluble carbohydrates, e.g. polysaccharides (Jansson, et al., Carbohydrate Res. 45, 275 (1975)) synthesized by Xanthomonas campestris micro-organisms (Xanflood-Kelco Corp., Galaxy-General Mills Corp.) hydroxypropyl guar gum (Jaguar ®HP-1, Celanese Corp.), carboxymethylcellulose (Cellulose Gum ®7H4., Hercules Corp.) and hydroxyethyl cellulose (CELLOSIZE ®QP100M, Union Carbide Corp.) were also examined. All water-soluble polymers were dissolved with stirring in aqueous solutions, in amounts sufficient to achieve 90 centipoise (cps) viscosity solutions in fresh, saline (3 weight percent sodium chloride) and in saline solutions also containing 0.3 weight percent magnesium sulfate, calcium/chloride, or other divalent non-transition metal salt. The rate of solution viscosity loss was observed to be independent of the amount of water-soluble polymer employed in prior studies for several thickeners; therefore, solution viscosities of 90 cps were selected for study to achieve maximum measurement sensitivity with a Brookfield Model LVT Synchro-lectric Viscometer with UL adapter, operated at a spindle speed of 6 rpm. The amounts of water-soluble polymers employed in the various aqueous solutions to achieve a 90 cps solution viscosity are recorded in Table III.

TABLE III

AMOUNT OF W-S POLYMER REQUIRED TO OBTAIN 90 cps SOLUTION VISCOSITY[b]

| WATER-SOLUBLE POLYMER | WEIGHT PERCENTS | | |
|---|---|---|---|
| | FRESH WATER | SALINE WATER | SALINE WATER WITH 0.3% DIVALENT ION SALT |
| Pusher ® - 700 | 0.11 | 0.55 | 0.55 |
| Polymer 835 | 0.09 | | |
| Xanflood ® | 0.17 | 0.19 | |
| Galaxy ® | 0.14 | 0.17 | |
| Jaguar ® HP-1 | 0.33 | | |
| Cellulose Gum ® 7H4 | 0.70 | | |
| CELLOSIZE ® 100M | 0.33 | 0.33 | 0.33 |
| Polyox ® WSR-301 | | | |

[b]Viscosities measured at 6 rpm spindle speed, 22.22° C., (72° F.) with Model LVT Brookfield Viscometer with UL adapter.

The polymers were dissolved in oxygen saturated (ca. 8.5 ppm) water or in aqueous solutions which had been previously purged with nitrogen containing 5 ppm oxygen so that aqueous solutions with approximately 1 ppm oxygen could be obtained. Aqueous solution dissolved oxygen concentrations were measured in a nitrogen atmosphere with a YSI Model 54A Oxygen Meter and solution pHs were monitored with a Beckman Zeromatic pH Meter.

In a given series of study, a specific quantity (325 ml) of solution was charged to a pressure bottle with a 350 ml capacity and capped. These procedures were conducted in a nitrogen atmosphere if the studies were related to low oxygen investigations. Independent studies wherein the glass containers were coated with the amines indicated that the viscosity losses noted with time were not the result of surface interactions between solution polymers and components on the surface of the glass. The containers in a given series were placed in an automated temperature control bath and removed at the time intervals reflected in the illustrations noted in this disclosure. Upon removal, the container was cooled in a 22.22° C. (72° F.) bath until a proportional temperature control regulator indicated equilibrium had been reached; then the solution parameters cited above were measured. The solution was then discarded.

In the polymer-preaddition studies, the water was nitrogen purged to lower the dissolved oxygen content to approximately 1 ppm. The polymer was then dissolved under a nitrogen atmosphere with stirring. Generally the dissolved oxygen content of the thickened solution increased despite attempts to avoid this occurrence. Under such circumstances the original desired oxygen concentration (ca. 1 ppm) was achieved through additional nitrogen purging; foaming of the thickened solutions creates a difficult sequence, but the procedure was effective. The primary scavenger, i.e. sodium dithionite, sodium sulfite etc., were added under a nitrogen atmosphere in solution or slurry form with the additive being evaluated.

All additives were employed in terms of weight percent, based on the total solution quantity employed. Examples of the additives employed are: ferric chloride, anhydrous, and (ethylene dinitrilo)-tetraacetic acid, tetra sodium salt, hydroxylamine hydrochloride and hexamethylene diamine, sodium tripolyphosphate, purified; calcium oxide, powder, magnesium sulfate, anhydrous, and ferrous chloride ($FeCl_2 \cdot 4H_2O$); magnesium oxide, powder, and calcium sulfate, powder, ethylene glycol, triethylene glycol, N-methylmorpholine, etc.; see the data mentioned above.

Noted among the family of the amines useful in the practice of this invention is an alicyclic amine product such as aminoethylpiperazine, imidazolene, triazoline, hexahydro-1,3,5, triazine, etc., which can be used effectively to achieve the objects of this invention under certain wellbore simulated conditions. The most effective alicyclic compounds generally follow the ease with which the functionalities of the alicyclic, and any appendiced aliphatic functionalities, can form "five and six membered rings" with the components whose activity is to be moderated or sequestered.

which retains at least 60% of its measured viscosity after 24 hours and thereafter there is less than 30% additional measured viscosity loss at the end of 10 days, the $O_2$ concentration of the medium being reduced to approximately 1 ppm by nitrogen purging prior to addition of the hydroxyethylcellulose polymer, and sodium sulfite or sodium dithionite at 25 ppm and 5 ppm concentration, respectively, is post-added to the medium at ambient temperature after addition of said hydroxyethylcellulose polymer and said amines.

2. The process of claim 1 wherein the medium contains sulfite or dithionite oxygen scavenger.

3. The process of claim 2 wherein the oxygen scavenger is added to the medium after addition of the mobility control agent and the amine.

4. The process of claim 1 wherein the amine is a polyalkylene polyamine.

5. The process of claim 1 wherein the amine is an alkanol amine.

6. The process of claim 1 wherein the amine is an alicyclic amine.

7. The process of claim 1 wherein the amine is a mixture of two or more of a polyalkylene polyamine, an alkanol amine and an alicyclic amine.

8. The process of claim 2 wherein the recovery is being effected under anaerobic conditions.

9. The process of claim 1 wherein the amine is a triethylene pentamine.

TABLE IV

TYPICAL ETHYLENE AMINE PRODUCT COMPOSITIONS
PRODUCT COMPOSITIONS. PERCENT BY WEIGHT

| | EDA | MEA | DETA | AEP | TETA | TEPA | MISC. CYCLIC DERIVATIVES WITH ALIPHATIC AMINE SIDE GROUPS | PEHA | HEHA | HIGHER MOLE WEIGHT ALIPHATIC HOMOLOGS |
|---|---|---|---|---|---|---|---|---|---|---|
| Ethylenediamine (EDA) | 100 | | | | | | | | | |
| Diethylenetriamine (DETA) | 0.1 | 0.3 | 99.5 | 0.1 | | | | | | |
| Aminoethylpiperazine (AEP) | | | 9 | 90 | 1 | | | | | |
| Triethylenetetramine (TETA) | | | 4 | 1 | 62 | | 33 | | | |
| Tetraethylene-pentamine (TEPA) | | | 3 | 1 | 8 | 30 | 36 | 6 | 16 | |
| Pentaethylene-hexamine (PEHA) | | | 1 | | 3 | 8 | 34 | 30 | 15 | 9 |
| Hexaethylene-heptamine (HEHA) | | | | | 1 | 2 | 32 | 10 | 30 | 25 |

The primary tests defining the performance capability of amine additives have been cited above in Table I and secondary tests associated with FIGS. 9, 10 and Table I.

What is claimed is:

1. In the process to effect enhanced recovery of oil from a subterranean reservoir with an aqueous driving medium whose viscosity has been increased by providing a water-soluble polysaccharide polymeric mobility control agent to the medium, the improvement which comprises providing an amine in the medium in the reservoir in an amount of between about 0.0001 to about 1.0 weight percent of the medium, which amine is one of an alkylene polyamine, an alkanol amine, an alicyclic polyamine, or a mixture of two or more of them, the aforesaid amines being selected such that when added at 300 ppm concentration in a hydroxyethylcellulose medium having a 90 cps viscosity and the medium temperature is maintained at 35° C. a medium is achieved 10. The process of claim 1 wherein the amine is hexaethylene heptamine.

11. The process of claim 1 wherein the amine is diethylene triamine.

12. The process of claim 1 wherein the amine is tetraethylenepentamine.

13. The process of claim 1 wherein the amine is poly(ethyleneimine).

14. The process of claim 1 wherein the amine is triethanolamine.

15. The process of claim 1 wherein the mobility control agent is hydroxyethyl cellulose.

16. The process of claim 1 wherein the polysaccharide is Synthesized by Xanthomonas campestris.

17. The process of claim 1 wherein the polysaccharide is a guar gum.

* * * * *

UNITED STATES PATENT AND TRADEMARK OFFICE
CERTIFICATE OF CORRECTION

PATENT NO. : 4,486,340

DATED : December 4, 1984

INVENTOR(S) : Joseph E. Glass, Jr.

It is certified that error appears in the above-identified patent and that said Letters Patent is hereby corrected as shown below:

Column 11, at line 34 change "; 75 ppm;" to --; ◇ 75 ppm;--; at line 35 change "; 500 ppm" to --; ◯ 500 ppm--; at line 36 change "10 ppm; 100 ppm" to --▼ 10 ppm; ▲ 100 ppm--; at line 40 change "(1000 ppm): ," to --(1000 ppm):◯,--; at line 41 change ", tetraethylenepentamine" to --◇, tetraethylenepentamine;--; at page 42 change "ethylenediamine; ," to --ethylenediamine; ◼,--; at line 43 change "hexamethylenediamine; ," to --hexamethylenediamine; ◆,--; at line 44 change "; , 30%" to --; ◯, 30%--; at line 48 change "HEC" to --◇:HEC--; at line 56 change "0:HEC" to --●:HEC--; at line 58 change ":HEC" to --◯:HEC--; at line 66 change ", Hydroxyethyl cellulose, ," to --◯, Hydroxyethyl cellulose; ⬣,--; and at line 67 change "gum, ," to --gum; ⬢,--.

Column 12, at line 4 change "0.5 ppm; ," to --◯, 0.5 ppm; ◯,-- and "; , 10.0 ppm" to --; ◼, 10.0 ppm--; at line 5 change "; , 17.0 ppm; ," to --◇, 17.0 ppm; ◆,--; at line 12, change ", 0.5 ppm; ," to --◯, 0.5 ppm; ◯,-- and "; , 10.0 ppm," to --; ◻, 10.0 ppm;--; at line 13 change "10.0 ppm" to --◼, 10.0 ppm--; at line 17 change ": , 10 ppm Hydrazine (Hz); ," to --: ◇, 10 ppm Hydrazine (Hz); ◈,--; at line 18 change "Hz; ," to --Hz; ▽,-- and "HEHA: ," to --HEHA; Δ,--; at line 19 change "; , 250 Hz" to --; ◻ 250 Hz--; at line 25 change ", ethylene diamine; ," to --◯, ethylene diamine; ●,--; at line 27 change ", ethanolamine" to --◯, ethanolamine--; at line 29 change "; , magnesium" to --; ◻, magnesium--; at line 30 change ", 25 ppm" to --◇, 25 ppm--; at line 36 change "ethylene diamine; ," to --◯, ethylene diamine; ●,--; at line 38 change ", ethanolamine" to --◯, ethanolamine--; at line 44 change ", 5.0 ppm Na$_2$S$_2$O$_4$" to --◯, 5.0 ppm Na$_2$S$_2$O$_4$--; at

UNITED STATES PATENT AND TRADEMARK OFFICE
CERTIFICATE OF CORRECTION

PATENT NO. : 4,486,340                          Page 2 of 2
DATED : December 4, 1984
INVENTOR(S) : Joseph E. Glass, Jr.

It is certified that error appears in the above-identified patent and that said Letters Patent is hereby corrected as shown below:

line 45 change "CaO;   ," to --CaO; ■,--; at line 52 change ",   5.0 ppm Na$_2$S$_2$O$_4$" to --○, 5.0 ppm Na$_2$S$_2$O$_4$--; at line 53 change "CaO;   ," to --CaO; ■,--; at line 60 change ":   , 250 ppm" to --: ◈, 250 ppm--; at line 61 change ";   , 250 ppm" to --; ⊞, 250 ppm--; at line 62 change ";   , 100 ppm" to --; ▥, 100 ppm--; at line 63 change "HEHA;   , 250" to --HEHA; ◆, 250--; at line 64 change ";   , 50 ppm" to --; ○, 50 ppm--; and at line 65 change ";   , 100 ppm" to --; ◉, 100 ppm--.

Column 13, at line 1 change ":   , 250 ppm" to --: ◈, 250 ppm--; at line 2 change "HDHA,   ," to --HDHA; ⊞,-- and "HEHA,   , 250" to --HEHA; ○, 250--; at line 4 change "buffer;   ," to --buffer; ⊖,--; at line 8 change ":   , 50 ppm" to --: ⊟, 50 ppm-- and ";   , 10" to --; □, 10--; at line 13 change ":   3 ppm" to --: ◇, 3 ppm--; at line 14 change "HEHA;   ," to --HEHA; ◕,-- and "TEPA;   ," to --TEPA; ◔,--; at line 20 change ":   ,   , 5 ppm" to --: ●, ○, 5 ppm--; and at line 21 change ",   , 5 ppm" to --●, ○, 5 ppm--.

Signed and Sealed this

Seventh Day of January 1986

[SEAL]

Attest:

DONALD J. QUIGG

Attesting Officer          Commissioner of Patents and Trademarks